United States Patent
McMillen

(10) Patent No.: US 7,512,634 B2
(45) Date of Patent: Mar. 31, 2009

(54) SYSTEMS AND METHODS FOR PROCESSING REGULAR EXPRESSIONS

(75) Inventor: Robert J. McMillen, Carlsbad, CA (US)

(73) Assignee: Tarari, Inc., San Diego, CA (US)

( * ) Notice: Subject to any disclaimer, the term of this patent is extended or adjusted under 35 U.S.C. 154(b) by 235 days.

(21) Appl. No.: 11/422,312

(22) Filed: Jun. 5, 2006

(65) Prior Publication Data

US 2007/0282833 A1    Dec. 6, 2007

(51) Int. Cl.
*G06F 17/00* (2006.01)
(52) U.S. Cl. .................. 707/104.1; 707/101; 707/102; 707/103 R; 717/140
(58) Field of Classification Search ............... 707/1–10, 707/100–104.1, 200–206; 717/140–161
See application file for complete search history.

(56) References Cited

U.S. PATENT DOCUMENTS

| | | | |
|---|---|---|---|
| 3,568,156 | A | 3/1971 | Thomson |
| 4,550,436 | A | 10/1985 | Freeman et al. |
| 5,317,509 | A | 5/1994 | Caldwell |
| 5,978,801 | A | 11/1999 | Yuasa |
| 6,202,064 | B1 | 3/2001 | Julliard |
| 6,216,131 | B1 | 4/2001 | Liu et al. |
| 6,275,574 | B1 | 8/2001 | Oran |
| 6,327,561 | B1 | 12/2001 | Smith et al. |
| 6,446,098 | B1 | 9/2002 | Iyer et al. |
| 6,477,571 | B1 | 11/2002 | Ross |
| 6,487,666 | B1 | 11/2002 | Shanklin et al. |
| 6,496,835 | B2 | 12/2002 | Liu et al. |
| 6,636,594 | B1 | 10/2003 | Oran |
| 6,675,162 | B1 | 1/2004 | Russell-Falla et al. |
| 2002/0103831 | A1 | 8/2002 | Iyer et al. |
| 2002/0116419 | A1 | 8/2002 | Iyer et al. |
| 2003/0051043 | A1 | 3/2003 | Wyschogrod et al. |
| 2003/0065800 | A1 | 4/2003 | Wyschogrod et al. |
| 2003/0110208 | A1 | 6/2003 | Wyschogrod et al. |
| 2003/0123447 | A1 | 7/2003 | Smith |
| 2003/0135653 | A1 | 7/2003 | Marovich |
| 2003/0163803 | A1* | 8/2003 | Wyschogrod et al. ....... 717/141 |
| 2003/0204584 | A1 | 10/2003 | Zeira et al. |
| 2005/0273450 | A1 | 12/2005 | McMillen et al. |

OTHER PUBLICATIONS

*Mastering Regular Expressions*, Second edition, J.E.F. Friedl, O'Reilly, Cambridge, 2002.

(Continued)

*Primary Examiner*—Isaac M Woo
(74) *Attorney, Agent, or Firm*—Knobbe Martens Olson & Bear, LLP

(57) ABSTRACT

A method for reducing the size of a DFA associated with a regular expression separates the functions of locating subexpressions within the DFA and determining if the located subexpressions satisfy a regular expression. For example, the functions of (1) locating subexpressions in a range asserting expression and, (2) determining whether the subexpressions satisfy the range of the range asserting expression are partitioned. In one embodiment, a first component may locate the subexpressions in a data stream using one or more DFAs, while a second component determines if the located subexpressions satisfy the range. In this embodiment, because the DFAs are not configured to determine a relationship between subexpressions, such as a range between subexpressions, the size of the resultant DFA may be significantly reduced.

27 Claims, 7 Drawing Sheets

OTHER PUBLICATIONS

*Compilers: Principles, Techniques, and Tools*, J.D. Ullman, A.V. Aho, and R. Sethi, Addison-Wesley Longman, inc., 1985.

*Lex & yacc, Second Edition*, T. Mason, J. Levine and D. Brown, O'Reilly Media, Inc. 1992.

* cited by examiner ab.{1,3}cd
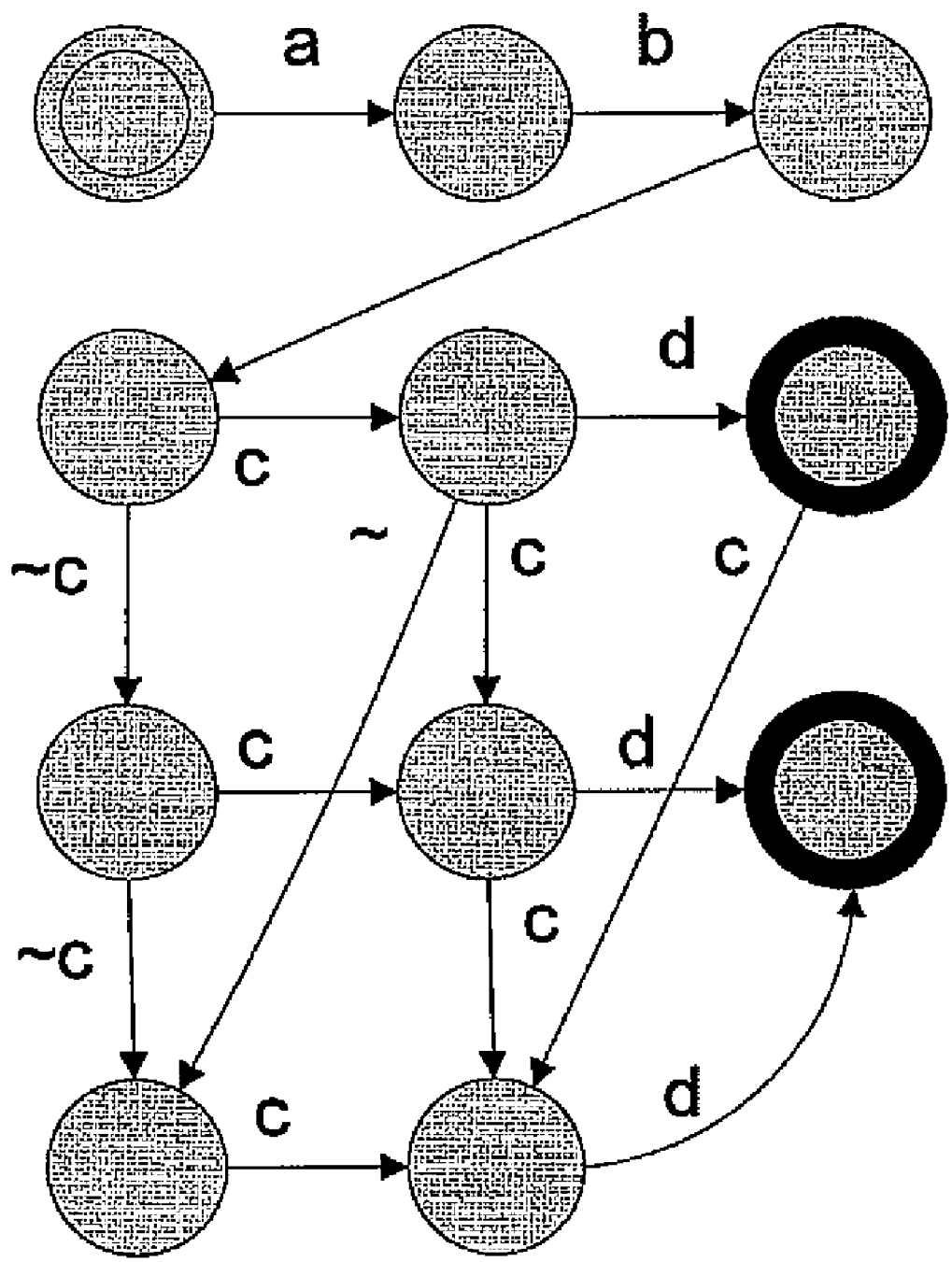
Figure 1ß

SYSTEMS AND METHODS FOR PROCESSING REGULAR EXPRESSIONS

BACKGROUND

1. Field of the Invention

The invention relates generally to methods and systems for performing pattern matching on digital data. More particularly, the invention involves systems and methods for processing regular expressions.

2. Description of the Related Art

With the maturation of computer and networking technology, the volume and types of data transmitted on the various networks have grown considerably. For example, symbols in various formats may be used to represent data. These symbols may be in textual forms, such as ASCII (American Standard Code for Information Interchange), EBCDIC (Extended Binary Coded Decimal Interchange Code), the fifteen ISO 8859, 8 bit character sets, or Unicode multi-byte character encodings such as, UTF-8 or UTF-16, for example. Data may also be stored and transmitted in specialized binary formats representing executable code, sound, images, and video, for example.

Along with the growth in the volume and types of data used in network communications, a need to process, understand, and transform the data has also increased. For example, the World Wide Web and the Internet comprise thousands of gateways, routers, switches, bridges, and hubs that interconnect millions of computers. Information is exchanged using numerous high level protocols like SMTP (Simple Mail Transfer Protocol), MIME (Multipurpose Internet Mail Extensions), HTTP (Hyper Text Transfer protocol), and FTP (File Transfer Protocol) on top of low level protocols like TCP (Transport Control Protocol), UDP (User Datagram Protocol), IP (Internet Protocol), MAP (Manufacturing Automation Protocol), and TOP (Technical and Office Protocol). The documents transported are represented using standards like RTF (Rich Text Format), HTML (Hyper Text Markup Language), XML (eXtensible Markup Language), and SGML (Standard Generalized Markup Language). These standards may further include instructions in other programming languages. For example, HTML may include the use of scripting languages like Java and Visual Basic.

As information is transported across a network, there are many points at which some of the information may be interpreted to make routing decisions. To reduce the complexity of making routing decisions, many protocols organize the information to be sent into a protocol specific header and an unrestricted payload. At the lowest level, it is common to subdivide the payload into packets and provide each packet with a header. In such a case (e.g., TCP/IP), the routing information required is at fixed locations, where relatively simple hardware can quickly find and interpret it. Because these routing operations are expected to occur at wire speeds, simplicity in determining the routing information is preferred. However, as discussed further below, a number of factors have increased the need to look more deeply inside packets to assess the contents of the payload in determining characteristics of the data, such as routing information.

Today's Internet is rife with security threats that take the form of viruses and denial of service attacks, for example. Furthermore, there is much unwanted incoming information sent in the form of SPAM and undesired outgoing information containing corporate secrets. There is undesired access to pornographic and sports web sites from inside companies and other organizations. In large web server installations, there is the need to load balance traffic based on content of the individual communications. These trends, and others, drive demand for more sophisticated processing at various points in the network and at server front ends at wire speeds and near wire speeds. These demands have given rise to anti-virus, intrusion detection and prevention, and content filtering technologies. At their core, these technologies depend on pattern matching. For example, anti-virus applications look for fragments of executable code and Java and Visual Basic scripts that correspond uniquely to previously captured viruses. Similarly, content filtering applications look for a threshold number of words that match keywords on lists representative of the type of content (e.g., SPAM) to be identified. In like manner, enforcement of restricted access to web sites is accomplished by checking the URL (Universal Resource Locator) identified in the HTTP header against a forbidden list.

Once the information arrives at a server, having survived all the routing, processing, and filtering that may have occurred in the network, it is typically further processed. This further processing may occur all at once when the information arrives, as in the case of a web server. Alternatively, this further processing may occur at stages, with a first one or more stages removing some layers of protocol with one or more intermediate forms being stored on disk, for example. Later stages may also process the information when the original payload is retrieved, as with an e-mail server, for example.

In the information processing examples cited above, the need for high speed processing becomes increasingly important due to the need to complete the processing in a network and also because of the volume of information that must be processed within a given time.

Regular expressions are well known in the prior art and have been in use for some time for pattern matching and lexical analysis. An early example of their use is disclosed by K. L. Thompson in U.S. Pat. No. 3,568,156, issued Mar. 2, 1971, which is hereby incorporated by reference in its entirety.

Regular expressions typically comprise terms and operators. A term may include a single symbol or multiple symbols combined with operators. Terms may also be recursive, so a single term may include multiple terms combined by operators. In dealing with regular expressions, three operations are defined, namely, juxtaposition, disjunction, and closure. In more modern terms, these operations are referred to as concatenation, selection, and repetition, respectively. Concatenation is implicit, one term is followed by another. Selection is represented by the logical OR operator which may be signified by a symbol, such as '|'. When using the selection operator, either term to which the operator applies will satisfy the expression. Repetition is represented by '*' which is often referred to as a Kleene star. The Kleene star, or other repetition operator, specifies zero or more occurrences of the term upon which it operates. Parentheses may also be used with regular expressions to group terms.

In order to implement a regular expression in software or hardware, a regular expression may be converted to a Deterministic Finite-state Automata ("DFA"), which is a finite state machine that defines state transitions for processing a regular expression, where for each pair of current state and input symbol there is one and only one transition to a next state. Because a DFA includes only one possible transition for any combination of current state and input symbol, DFAs are desirable for implementation of regular expression functionality in software or hardware. However, as described in further detail below, when certain regular expressions are converted to corresponding DFAs, the size of the DFAs are very large, to the point that some regular expression functions produce DFAs that are too large to be executed on existing computing systems. Accordingly, improved systems and methods for processing regular expressions that include such functions are desired.

In order to convert a regular expression to a DFA, the regular expression is typically first converted to a nondeterministic finite-state automata ("NFA"), which is a finite state machine where for each pair of current state and input symbol there may be several possible next states. Thus, NFAs involve a searching process in which many trials fail, and backtracking is required for each failure. Accordingly, NFAs are typically not suitable for high speed applications. There are, however, regular expression parsers that work using NFAs, but they are generally slower than those that use DFAs due to the fact that a DFA has a unique path for each accepting string. Backtracking in DFAs is minimal and only occurs when nothing matches or as a result of trying to match the longest string possible. In the latter case, if a longer match fails, the input text that is not included in a shorter match is reprocessed. As those of skill in the art will recognize, after converting a regular expression to a NFA, the NFA may be converted to a DFA and implemented in software or hardware. Thus, the process of converting a regular expression to a DFA typically involves a two step process including converting the regular expression to a NFA and then converting the NFA to a DFA.

SUMMARY

In one embodiment, a device for compiling a regular expression, wherein the regular expression comprises a first subexpression and a second subexpression, comprises a component configured to receive the regular expression and generate a DFA corresponding to the regular expression, wherein the DFA comprises a first terminal state indicative of locating the first subexpression and a second terminal state indicative of locating the second subexpression, wherein upon reaching the first or second terminal state, the component initiates recordation of tokens regarding the respective first and second subexpressions; the component being further configured to define a match criteria, the match criteria and the tokens being usable to determine whether the regular expression is matched in an input data stream.

In another embodiment, a method of processing a regular expression comprising a range asserting expression comprises receiving a regular expression comprising a range asserting expression, determining a first subexpression of the range asserting expression, determining a second subexpression of the range asserting expression, generating a DFA for locating the first subexpression and the second subexpression, wherein the DFA comprises terminal states corresponding to location of each of the first and second subexpressions in a received data stream, storing information indicating a relationship between the first and second subexpressions as indicated in the range asserting expression, applying the DFA to the received data stream, in response to reaching a first terminal state indicating location of the first subexpression, storing a location of the first subexpression, in response to reaching a second terminal state indicating location of the second subexpression, storing a location of the second subexpression and evaluating the relationship information by determining if the relationship between the first and second subexpressions is satisfied by the located subexpressions.

In one embodiment, a post-processing module for determining if a range asserting expression comprises two or more subexpressions is located in a data stream comprises template means for selecting a template comprising match criteria associated with the range asserting expression, storage means for storing the selected template, and execution means for receiving tokens containing information regarding the two or more subexpressions and for applying the match criteria to the received tokens to determine if the range asserting expression is located in the data stream.

In another embodiment, a system for analyzing a data stream in order to match a regular expression comprising at least one atom to a portion of the data stream, wherein the regular expression comprises at least a first subexpression and a second subexpression, comprises a compiler configured to generate a state machine comprising a first terminal state indicative of locating the first subexpression and a second terminal state indicative of locating the second subexpression, wherein the compiler is further configured to generate a template comprising relationship information regarding the first and second subexpressions as indicated in the regular expression, a processing engine in data communication with the compiler and configured to receive the data stream and apply the state machine to the data stream, wherein upon reaching the first or second terminal state the processing engine initiates recordation of tokens regarding the respective first and second subexpressions. The system may further comprise a post processing module in data communication with the processing engine and configured to receive the tokens and the templates, wherein the post processing module determines if the relationship information indicated in the template is satisfied by received templates.

In another embodiment, a method of processing a regular expression comprises generating a DFA corresponding to the regular expression, applying the DFA to a received data stream in order to generate information regarding two or more subexpressions in the received data file, and processing information regarding a relationship between the two or more subexpressions and the information regarding the two or more subexpressions in the received data file in order to determine if the received data file satisfies the regular expression.

In another embodiment, a method of processing a regular expression comprising a range asserting expression comprises applying a DFA corresponding to the regular expression to a data set, and subsequent to applying the DFA, identifying a range asserting expression in the data set based at least in part upon one or more outputs from the DFA.

BRIEF DESCRIPTION OF THE DRAWINGS

FIG. 1B illustrates an exemplary DFA created based on the NFA of FIG. 1A.

DETAILED DESCRIPTION OF CERTAIN EMBODIMENT

Figure 1A:
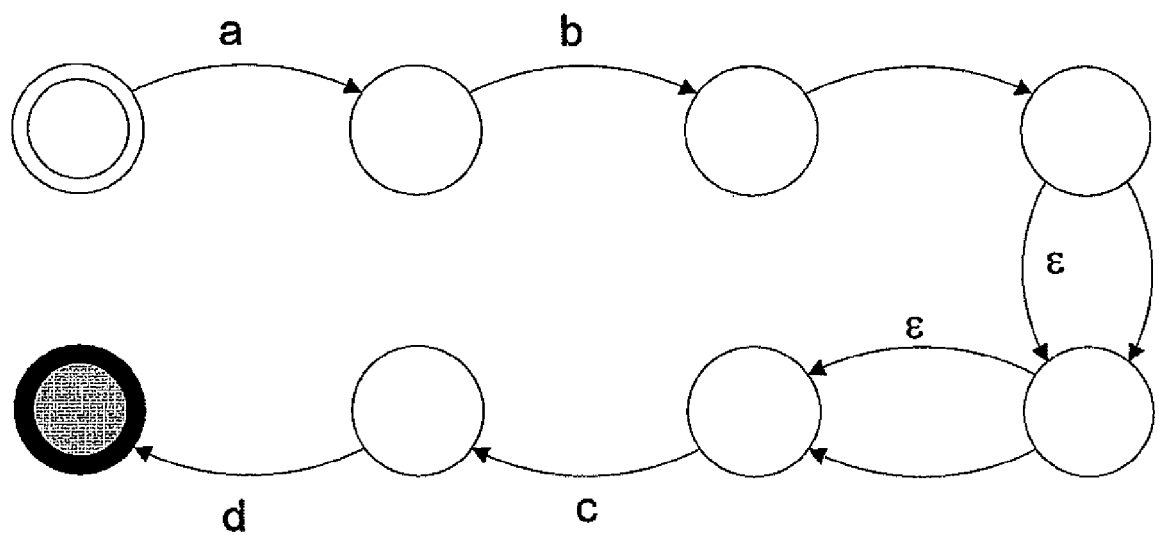
FIG. 1A illustrates an exemplary NFA.

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

In order to more clearly describe the improved systems and methods described herein, provided below are definitions of certain terms used herein.

A "character class" is a set of characters that will find a match if any one of the characters included in the set matches. For example, the character class [A-Z0-9#$%] matches any single character from A-Z, 0-9, or the characters "#", "$", and "%". Similarly, the character class [aeiou] matches any single character included in the specified set of characters, i.e., any vowel in the English language.

A "universal character class" matches any characters in an available character set. For example, a universal character class may be matched using [\x00-\xFF] (assuming characters are represented using 8 bits) or ".", A "negated character class" is a set of characters that will find a match if any one of the characters not included in the set matches. For example, the character class [Aaeiou] matches any single character not in the specified set of characters.

A "repetition operator" will repeat a character class a specified number of times. For example, the repetition operator {3} will find a match if the character class preceding the repetition operator is repeated three times. Repetition operators may also include a range, such as {x,y}, indicating that in order to find a match the character class preceding the repetition operator must be repeated at least x but not more than y times.

An "atom" is a combination of a character class and optional repetition operator. For example, the expression "[A-Z]{1,5}" is an atom comprising the character class [A-Z] and the repetition operator {1,5}. This atom matches any string of from 1 to 5 characters in the character class [A-Z]. A "byte counting atom" is a specific type of atom that uses the universal character class. It may be expressed as ".{1,5}", for example.

An "alternation operator" is used to specify alternatives in a regular expression. In certain embodiments, the characters "|" or "or" represent alternation operators.

"Grouped atoms" are one or more atoms enclosed in parentheses. For example, if "a", "b", and "c" each represent atoms, "(abc)" represents grouped atoms.

An "expression" is a concatenation of one or more atoms with optional alternation and grouping. For example, "gray|grey" is an expression including two atoms and an alternation operator.

A "subexpression" comprises one or more contiguous atoms or grouped atoms that are a proper subset of an expression. For example, "gray|grey" comprises two subexpressions "gray" and "grey".

A "range asserting expression" contains at least two subexpressions separated by a byte counting atom. For example, the range asserting expression "ab.{1,5} cde" matches the subexpression "ab" separated from between 1 and 5 characters (from the universal character class) from the subexpression "cde". A range asserting expression may also be referred to as a byte counting construct or a dot curly brace construct. A range asserting expression may be used to establish an allowed distance between the subexpressions. For example, if α and β represent subexpressions, the byte counting construct α.{x,y}β determines if subexpression α is located between x and y character away from subexpression β in a received data stream.

FIG. 1A illustrates an exemplary NFA representative of the regular expression "ab.{1,3}cd". The NFA of FIG. 1A includes several epsilon transitions, denoted by the epsilon character "ε". In an NFA, an epsilon transition can occur spontaneously or between state transitions. The exemplary state machine of FIG. 1A is non-deterministic due to the use of multiple transitions, including epsilon transitions, from each of several states. The exemplary NFA of FIG. 1A comprises 8 states that locate occurrences in a data stream of the subexpression "ab" that are not less than 1 character, and not more than 3 characters, away from the subexpression "cd".

FIG. 1B illustrates an exemplary DFA created using the methodology described above for converting a regular expression to a NFA, and then converting the NFA to a DFA. More particularly, FIG. 1B illustrates a DFA that corresponds with the NFA of FIG. 1A. As noted above, a DFA only includes one transition for each combination of present state and input symbol. Thus, the DFA illustrated in FIG. 1B, corresponding to the regular expression "ab.{1,3}cd", contains 11 states. The DFA of FIG. 1B may be used to locate occurrences in a data stream of the subexpression "ab" that are not less than 1 character, and not more than 3 characters, away from the subexpression "cd".

Figure 2A:
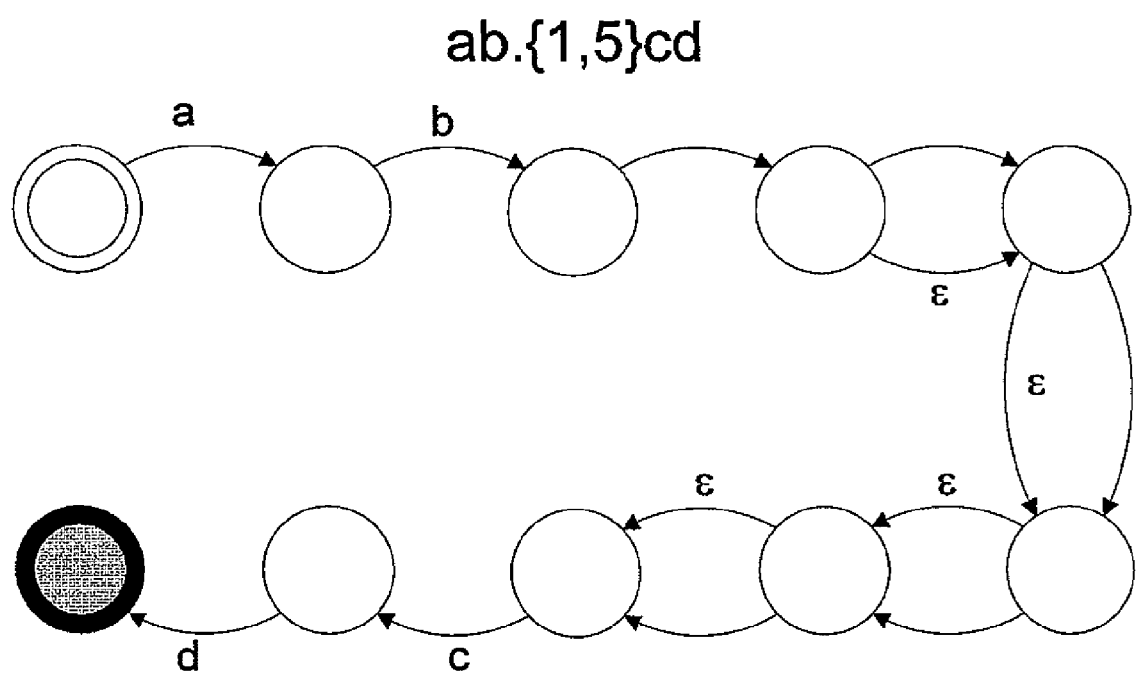
FIG. 2A illustrates another exemplary NFA.
Figure 2B:
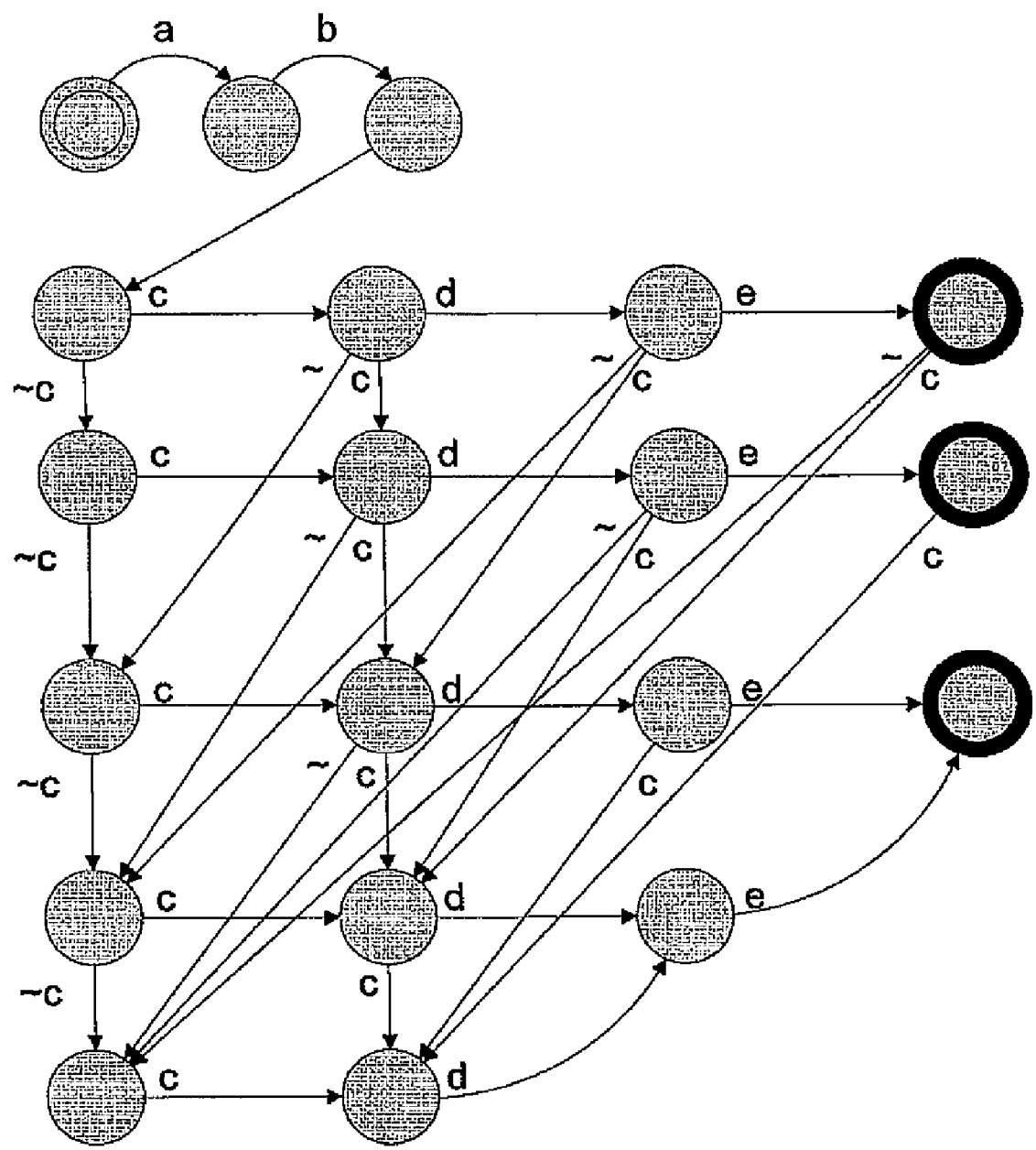
FIG. 2B illustrates another exemplary DFA based on the NFA of FIG. 2A.

FIG. 2A illustrates an exemplary NFA that corresponds with the byte counting construct "ab.{1,5}cde". FIG. 2B illustrates an exemplary DFA created using the methodology described above for converting a regular expression to a NFA, and then converting the NFA to a DFA. More particularly, the DFA of FIG. 2B corresponds with the NFA of FIG. 2A, which represents the byte counting construct "ab.{1,5}cde". In this byte counting construct, the byte counting atom is ".{1,5}" and the subexpressions are "ab" and "cde". As shown in FIGS. 2A and 2B, the number of states required to represent this byte counting construct in an NFA is 10, while the same byte counting construct expressed in a DFA uses 20 states. Thus, the number of DFA states needed for this byte counting construct has significantly increased from the number of states required to represent the byte counting construct "ab.{1,3}cd" illustrated in FIG. 1B. As those of skill in the art will recognize, as the size of the subexpressions and/or the range of the byte counting atom increase, the number of DFA states required to represent a byte counting construct increases exponentially. Furthermore, typical applications may contain many thousands of such expressions, which further increase the memory and processing requirements of the regular expression engine.

In general, the number of states required for a byte counting construct is approximately the size of the range plus 1 (e.g., y−x+1) times the number of characters in the subexpressions that follows the byte counting atom, plus the number of characters in the subexpression that preceded the byte counting atom, plus the minimum of the range (e.g., x). Thus, for the byte counting construct "ab.{1,5} cde" the approximate number of DFA states will be about (5−1+1)×3+2+1=18. As indicated by this formula, as the range of the byte counting atom increases and the number of characters in the subexpressions increase, the number of states required to express the byte counting construct in a DFA becomes exponentially larger. For example, in order to express the regular expression "Subject:.{1,50}Viagra" in a DFA, approximately (50−1+1)×6+8+1=309 states are required. As the regular expressions using the dot-curly-brace expression become even more lengthy, the size of the corresponding DFA and the size of the memory required to store the DFA can quickly become too large for a computing system to handle.

In addition to the above-discussed examples of large DFAs that correspond with byte counting constructs, the size of a DFA increases even faster if a byte counting construct includes multiple byte counting atoms and multiple subexpressions. For example, a byte counting construct may include "α.{0,42}β.{0,8}γ" where α, β, and γ are each subexpressions. In this example, in order to find a match for this byte counting construct the regular expression processor must locate subexpression α within 0 and 42 characters of subexpression β, as well as locate subexpression β within 0 and 8 characters of subexpression γ. Thus, both byte counting atoms must be satisfied in order to result in a match. However, the number of states required to express such a regular expression in a DFA is not simply the sum of the states required for both expressions. Thus, the number of states required for such a byte counting construct may be even larger than the number of states required for each subexpression alone. For example, in one implementation, the number of DFA states needed to implement the byte counting construct "α.{0,42}β.{0,8}γ" is about 2,410 DFA states.

In the field of network security, locations of series of characters within a certain distance from another series of characters may identify the presence of a virus or other malicious code. However, the length of these subexpressions and the possible distance between the subexpressions are often much larger than in the previous examples. For example, a DFA that locates a 27 character subexpression that is from 0 to 187 characters away from a 36 character subexpression may require about 2,034 states and, depending on the particular implementation of the DFA in memory, may require over 500 KBs of memory. For example, in some embodiments, each state may include 256 instructions, one instruction for each possible input character. In this embodiment, the current state may be represented by the base address of the block of instructions for the state, and the instruction to transition to a next state is determined by adding the current character to this base address. Using this type of implementation, the above example would require about 2,034×256=520,704 words of memory. In other embodiments, however, the memory requirements may be reduced by applying one or more optimizations to the regular expression. For example, U.S. patent application Ser. No. 10/851,482 titled "REGULAR EXPRESSION ACCELERATION ENGINE AND PROCESSING MODEL," which is hereby incorporated by reference in its entirety, describes systems and methods of optimizing memory requirements for storage of DFAs.

As noted above, as the range and size of subexpressions included in byte counting constructs increase, the implementation of a corresponding DFA in software and/or hardware becomes increasingly complex and, at some point, the size of the DFA becomes too large for the memory and/or computing capabilities of the computing device. Accordingly, there is a need for improved methods and systems for compiling regular expressions including byte counting constructs into DFAs that require fewer states and, thus, less memory. Such an improvement would increase the range of possibilities available in a byte counting construct, as well as other regular expressions that introduce a similar state explosion when converted to a DFA. Accordingly, described below are exemplary systems and methods for generating and executing DFAs that include fewer states. In one embodiment, the tasks of (1) locating subexpressions in a range asserting expression and, (2) determining whether the subexpressions satisfy the range of the range asserting expression are partitioned. As noted above, in the prior art, both of these tasks are performed by a single DFA. According to the new systems and methods described herein, a first component may locate the subexpressions in a data stream using one or more DFAs, while a second component determines if the located subexpressions satisfy the range. In this embodiment, because the DFAs are not configured to determine a relationship between subexpressions, such as a range between subexpressions, the size of the resultant DFA may be significantly reduced.

In one embodiment, the subexpressions of a range asserting expression are each assigned to a separate terminal state of a DFA, the terminal states each being associated with a reporting mechanism that generates a token indicating at least a location of the identified subexpression. Thus, rather than including a terminal state for the location of the entire pattern that matches the range asserting expression, including location of each subexpression within the construct separated by predetermined distances within the data stream, the DFA includes terminal states associated with location of each subexpression in the data stream. In one embodiment, a compiler that generates the DFAs also generates match criteria that may be processed, along with the location information for any located subexpressions, in order to determine if a particular range asserting expression has been located. As described in further detail below, these systems and methods advantageously decrease the number of states in a DFA representing a range asserting expression, and correspondingly decrease memory requirements of the computing device that stores and executes the DFA.

Lexical parsers are typically considered linear, meaning that they do not match overlapping subexpressions. In order to make a lexical parser non-linear, multiple executions of a DFA may be required, as well as record keeping of matches located in each execution of the DFA.

The partitioned method of locating regular expressions described herein advantageously runs in a pattern matching mode, whereby all matches of a regular expression may be returned. Thus, subexpressions that overlap may each be considered in evaluating a regular expression. Additionally, a single subexpression may be evaluated as a subexpression of multiple constructs. Because of the partitioned nature of the regular expression evaluation system described herein, the execution of the DFAs need only execute once on an input data stream in order to locate overlapping subexpressions.

Figure 3:
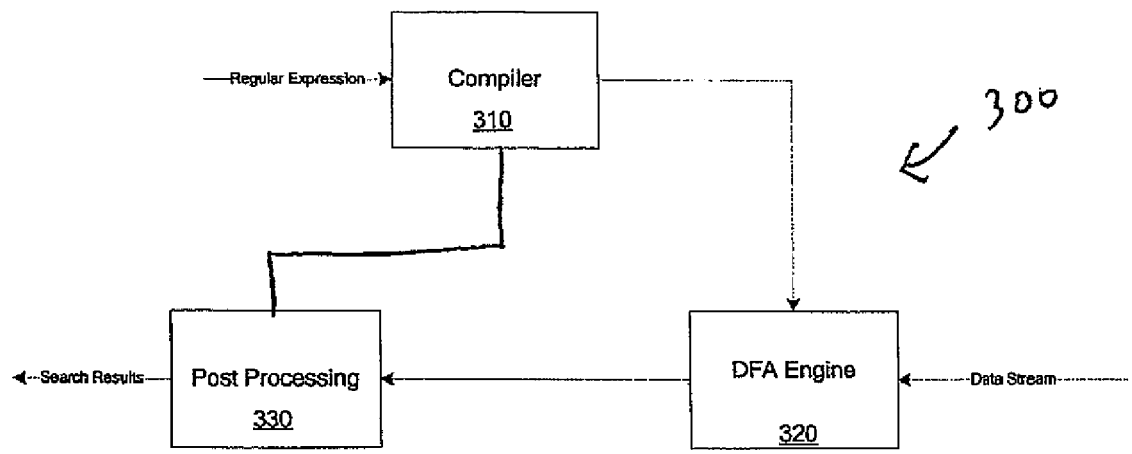
FIG. 3 is a block diagram illustrating exemplary modules of a regular expression execution apparatus.

FIG. 3 is a block diagram illustrating exemplary modules of a regular expression execution apparatus 300. The exemplary execution apparatus 300 is configured to generate DFAs including terminal states for each subexpression, execute the DFA on an incoming data stream, and determine if a regular expression including one or more byte counting constructs has been satisfied by the data stream. In the embodiment of FIG. 3, the exemplary execution apparatus 300 comprises three modules, including a compiler 310, regular expression search logic 320, and post processing module 330. In some embodiments, the functionality of the modules illustrated in FIG. 3 may be performed by one or more computing devices. The term "module," as used herein, means, but is not limited to, a software or hardware component, such as a field programmable gate array (FPGA) or an application specific integrated circuit (ASIC), which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

In operation, the compiler 310 receives a regular expression that is to be executed on a data stream. The compiler 310 analyzes the regular expression and if the regular expression contains one or more byte counting constructs, or other range-finding constructs that will be discussed further below, the compiler 310 generates one or more DFAs that comprise multiple terminal states, where each terminal state corresponds with one of the subexpressions in the byte counting construct, for example. Thus, when one of the terminal states is reached, the DFA has located an occurrence of a subexpression. Because the DFA includes separate terminal states for the location of each subexpression, rather than terminal state(s) only for location of all subexpression in the byte counting construct, the DFA may be much smaller than a DFA that is generated using prior art methods. In one embodiment, the DFAs generated by the compiler 310 are generated by first converting regular expression to an NFA and then converting the NFA to a DFA.

As described in further detail below, in the embodiment of FIG. 3 the compiler 310 also generates post processing information, including match criteria indicating a relationship between the subexpressions of the byte counting construct. In one embodiment, this post processing information is used by the post processing module 330 to determine whether the regular expression has been satisfied, based upon tokens that are returned by the DFA engine 320 indicating locations of identified subexpressions in the received data stream and the match criteria.

Figure 4:
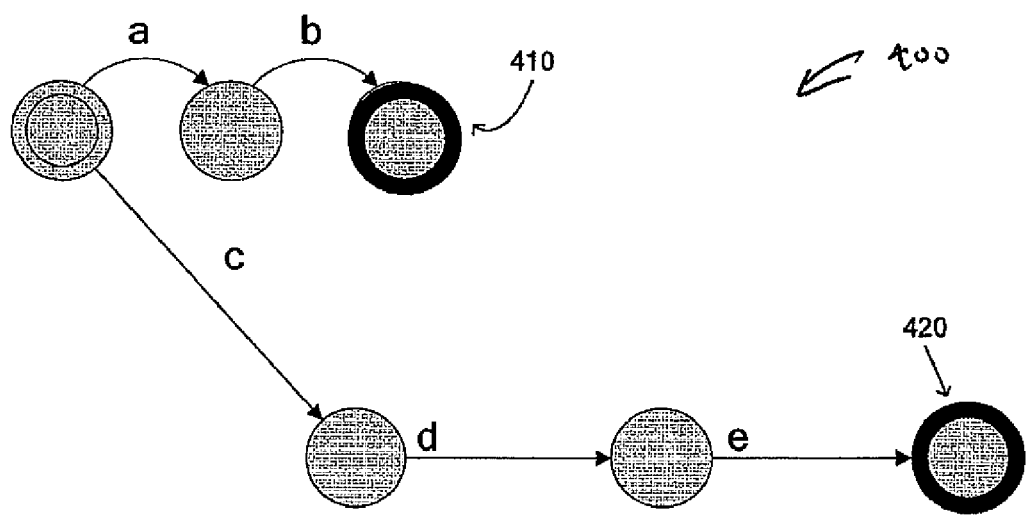
FIG. 4 illustrates an exemplary DFA generated by the compiler of FIG. 3.

FIG. 4 illustrates an exemplary DFA generated by the compiler 310. The DFA illustrated in FIG. 4 represents the same byte counting construct discussed above with reference to FIG. 2, i.e., "ab.{1,5}cde". However, as shown in FIG. 4, the number of states in the state machine is only 7, while the DFA of FIG. 2 includes 20 states. Thus, the memory requirements for implementing the state machine of FIG. 4 compared to implementation of the state machine of FIG. 2 may be reduced by a factor of more than 50%.

As shown in FIG. 4, a first terminal state 410 is associated with location of the characters "ab" in an input data stream, while the terminal state 420 is associated with the location of the characters "cde". In this embodiment, when either of the terminal states 410, 420 is reached, a token including characteristics regarding the respective subexpression that has been located is stored in a memory. In one embodiment, each token includes a start position and end position of a located subexpression, as well as an identifier of the located subexpression. Differing from the DFA of FIG. 2, the DFA 400 does not include states that correspond with characters that are located between the subexpressions within the provided range. For example, many of the states of the DFA 200 are included to catch each combination of characters in the range of one to five between the first subexpression "ab" and the second subexpression "cde". Thus, by removing the need to include states that match each possible range between subexpressions of a byte counting construct, the number of states in the DFA 400 is significantly reduced.

In other embodiments, the tokens may include additional information, such as the start and/or end location of each matched lexeme, and the tokens may be recorded in various formats and in various data configurations. In one embodiment, information regarding multiple tokens may be aggregated and transmitted to the post processing module 330. For example, a count of the number of times a particular token was generated in processing of a data stream may be returned.

In another embodiment, a token may include an indication of whether each of multiple regular expressions was matched in a data stream. For example, a token may include a bit vector with one bit associated with each regular expression, where a respective bit may be set to 1 if that expression was found in the data stream and set to 0 if it was not located in the data stream. In one embodiment, the tokens are stored in volatile memory, such as RAM or SRAM. However, in other embodiments, the tokens may be stored in any type of memory, including non-volatile or flash memory, for example.

In the embodiment of FIG. 3, in one embodiment the compiler 310 generates post processing information, including match criteria indicating a relationship between the subexpressions in the byte counting construct. In one embodiment, a template may be selected based on the post processing information. In general, a template comprises a set of assertions. An assertion related to a byte counting construct, for example, may indicate a first and second subexpression, and a range between the subexpressions. If all of the assertions in a particular template are satisfied, then the regular expression associated with the template is matched. In some embodiments, a single template may represent multiple byte counting constructs or other range asserting expressions within a regular expression, while in other embodiments, each range asserting expression is associated with a separate template.

In one embodiment, the compiler 310 generates a template corresponding to one or more regular expressions that is to be applied to a data stream. For example, if a regular expression comprises a byte counting construct, the template may include an indication of a byte distance between subexpressions, as well as a representation of each subexpression. With respect to FIG. 3, for example, the templates are transmitted from the compiler 310 to the post processing module 330 so that the templates may be used by the post processing module to identify matches in the data stream. A template may indicate, for example, that a byte counting construct is satisfied if tokens corresponding to first and second subexpressions indicate that the subexpressions are between one and five characters apart in the data stream. Those of skill in the art will recognize that there are multiple ways to indicate such a relationship. The systems and methods described herein are intended to function using various formats for recording and executing the match criteria, such as through the use of templates as described herein. In one embodiment, the compiler 310 outputs the generated DFA, or DFAs, to the DFA engine 320 and also outputs the post processing information, such as the templates, to the post processing module 330.

In one embodiment, the DFA engine 320 is configured to receive a data stream upon which the regular expression is to be applied. Thus, the DFA engine 320 applies the DFA provided by the compiler 310 on the received data stream. In one embodiment, the DFA engine 320 applies the DFA in real-time as the data stream is received on an input connection, such as via an Internet connection. In this embodiment, the DFA engine 320 may implement the DFA in hardware, such as in one or more field programmable gate arrays (FPGAs), in order to increase a theoretical throughput of the DFA. However, in other embodiments, the DFA engine 320 may be implemented in software alone, or in any combination of software and hardware components.

The DFA engine 320 may be configured to operate in a "stingy", "greedy", or a "match-all" matching mode. In general, greedy pattern matching means that the matcher, such as the DFA engine 320, returns the longest match possible. For example, applying the regular expression 'S.*r' to 'StarSister' matches 'StarSister' rather than the shorter 'Star' or 'Sister' when the matcher operates in greedy mode. In contrast, stingy matching mode matches only the shortest match possible. For example, if stingy matching mode is used in the evaluation of 'S.*r' to 'StarSister', the matcher returns the shortest match: 'Star' followed by another short match to 'Sister'. Match-all mode is a superset of the stingy and greedy matching modes that returns all possible matches, including the shortest match possible (e.g., stingy mode match), the longest match possible (e.g., greedy mode match), and all other matches. For example, applying the regular expression 'S.*r' to 'StarSister' matches 'Star', 'Sister' and 'StarSister', when the matcher operates in match-all mode. In certain embodiments, match-all mode also allows the DFA engine 320 to evaluate expressions that may match text without consuming any characters from the input string, often referred to as zero-width assertions.

In one embodiment, the DFA engine 320 is configured to operate in a match-all mode so that all possible matches to a regular expression are located by the DFA engine 320. In one embodiment, the DFA engine 320 may be alternated between matching modes, such as between match-all and greedy matching modes. In one embodiment, the DFA engine 320 operates in either match-all or greedy mode, where the mode is determined at compile time, such as by the compiler 310. In another embodiment, the regular expression syntax indicates to the DFA engine 320 whether the regular expression, or portion of the regular expression, should be evaluated in match-all, stingy, or greedy modes. For example, in certain embodiments the use of a '?' following another repetition operator, such as ?, *, +, etc, i.e., ??, *?, +?, indicates that stingy mode should be used. Similarly, in certain embodiments other syntaxes may indicate that greedy or match-all modes should be used. It is contemplated that the systems and methods described herein are operable using any currently know or later developed regular expression syntax. Examples of existing regular expression notations or languages known in the art include awk, flex, grep, egrep, Perl, POSIX, Python, and tcl. Regular expressions, and the various regular expression syntaxes, may be better understood by referring to *Mastering Regular Expressions*, Second Edition, J. E. F. Friedl, O'Reilly, Cambridge, 2002, which is hereby incorporated by reference in its entirety for all purposes.

The DFA engine 320 is configured to generate tokens related to located subexpressions in the received data stream. In one embodiment, the DFA engine 320 transmits the generated tokens to the post processing module 330. In other embodiments, the tokens are stored in a memory that is accessible to both the post processing module 330 and the DFA engine 320.

The post processing module 330 determines, based upon the post processing information generated by the compiler 310 and the tokens generated by the DFA engine 320, whether the byte counting construct has located a match within the received data stream. For example, the post processing module 330 determines a distance between the located subexpressions based upon location information included in the tokens related to each of the subexpressions. This determined distance between the subexpressions may then be compared to the match criteria contained in the post processing information, which in one embodiment includes a required distance between the subexpressions. If the match criteria are satisfied, the post processing module 330 outputs data indicating that the regular expression was satisfied and optionally, outputs the exact location and length of the subexpressions that satisfy the byte counting construct.

As those of skill in the art recognize, not all regular expressions contain byte counting atoms. For example, a regular expression may locate a subexpression. In this embodiment, the DFA engine 320 returns a single token and a template may be selected by the post processing module 330 that is satisfied when it sees one token. In another embodiment, the post processing module 330 may be bypassed for those regular expressions that do not contain byte counting atoms. In another embodiment, the compiler 310 assigns a first identifier, such as a number in a first range of numbers, to tokens corresponding to non-byte counting atoms and a second identifier, such as a number in a second range of numbers, to tokens corresponding to byte counting atoms. The post processing module 330 may be configured to identify the tokens that should be considered in currently selected templates, or tokens that might trigger selection of new templates, based on the assigned identifier. For example, if numbers are assigned to tokens as described above, a threshold number may be compared to the number assigned to each token in order to determine if the post processing module 330 should pass the token or associate the token with one or more templates. In one embodiment, a token may be in both groups, satisfying a non-byte counting atom and indicating location of a subexpression of a byte counting atom. In this embodiment, a third identifier, such as a third range of numbers or a flag, may be assigned to the tokens.

In one embodiment, the transfer of tokens from the DFA engine 320 to the post processing module 330 is pipelined, such that tokens output from the DFA engine 320 are immediately processed by the post processing module 330. In another embodiment, a 'store-and-forward' approach can be used in which multiple tokens from the DFA engine 320 are saved in a memory and at some later time transmitted to the post processing module. In this embodiment, the DFA engine 320 and the post processing module 330 are not required to operate at the same rate. In one embodiment, if the post processing module 330 is twice as fast as the DFA engine 320, then two DFA engines 320 may feed one post processing module 330. In another embodiment, tokens may also be stored at the post processing module 330 prior to processing. For example, if multiple DFA engines 320 provide data to the post processing module 330, the post processing module 330 may store tokens received from the DFA engines 320 until a scheduled processing time for tokens from each respective DFA engine. Likewise, if the post processing module 330 is half as fast as the DFA engine 320, then one DFA engines 320 may feed two post processing module 330.

Figure 5:
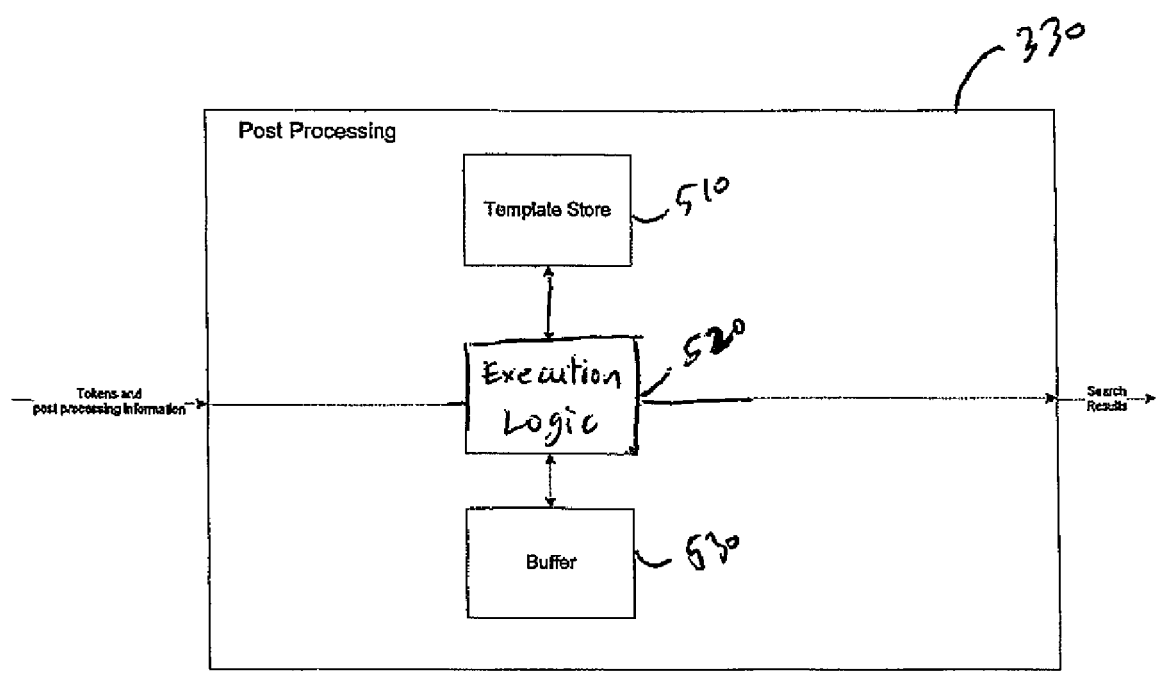
FIG. 5 is a block diagram illustrating exemplary components of the post processing module of FIG. 3.

FIG. 5 is a block diagram illustrating exemplary components of the post processing module 330 of FIG. 3. As shown in FIG. 5, the exemplary post processing module 330 comprises a template store 510, execution logic 520, and a buffer 530. In one embodiment, the execution logic 520 of the post processing module 330 receives the tokens and post processing information. In one embodiment, the post processing information generated by the compiler 310 includes an indication of a template that should be selected and applied to the generated tokens. In one embodiment, templates are associated with various range asserting expressions, such as byte counting constructs, and with particular variations of range asserting expressions. Thus, in order to match the byte counting construct discussed with respect to FIG. 4, for example, a template associated with a byte counting construct including two subexpressions may be selected. Likewise, if a byte counting construct includes four subexpressions, for example, a different template may be selected by the post processing module 330. In the embodiment of FIG. 5, a template store 510 maintains in memory a plurality of static templates associated with the various range asserting expressions and/or regular expressions that the post processing module 330 is configured to locate. The template store 510 may be updated with additional and/or revised templates as the regular expression search needs change. In one embodiment the templates stored in the template store 510 are in a compressed format, and when selected, the compressed template are decompressed.

In one embodiment, the templates that have been selected via the execution logic 520 based on post processing information received from the compiler 310, referred to herein as active templates, are maintained in the template store 510 along with the static templates. In other embodiments, the active templates are stored in a separate memory, such as in the buffer 530. In one embodiment, the static templates, which comprise information such as, the assertions related to the range asserting expression, an indicator of how many subexpressions are included in the range asserting expression, an indication of a retirement distance, and/or an event trigger that should occur upon location of one or more specified tokens, are not changed as tokens are located in the data stream. In one embodiment, the active templates include a bit vector that allows recordation of token information for each subexpression included in the range asserting expression. In one embodiment, the active template is updated with token information as each newly generated token associated with the particular template is received.

The buffer 530 may comprise any suitable type of memory, such as RAM or flash memory, for example. In one embodiment, memory locations in the buffer 530 are reserved for storage of token information related to the selected template. For example, in a template that compares token information from two subexpressions, memory space in the buffer 530 sufficient to maintain token information for multiple occurrences of each of the subexpressions may be reserved by the execution logic 520. In other embodiments, token information related to a selected template is stored in any available memory locations of the buffer 530.

In one embodiment, the execution logic 520 evaluates templates stored in the buffer 530 when a new token is generated by the DFA engine 320. In certain embodiments, multiple templates may be concurrently activated. Thus, multiple range asserting expressions may be concurrently processed by the post processing module 330 as new tokens are generated by the DFA engine 320. In one embodiment, only the active templates to which a newly located token is associated are evaluated when the newly located token is made available to the post processing module 330. If all of the assertions in an evaluated template are satisfied, indicating that a range asserting expression associated with the template has been located in the data stream, the execution logic 520 outputs an indication of the located range asserting expression.

Figure 6:
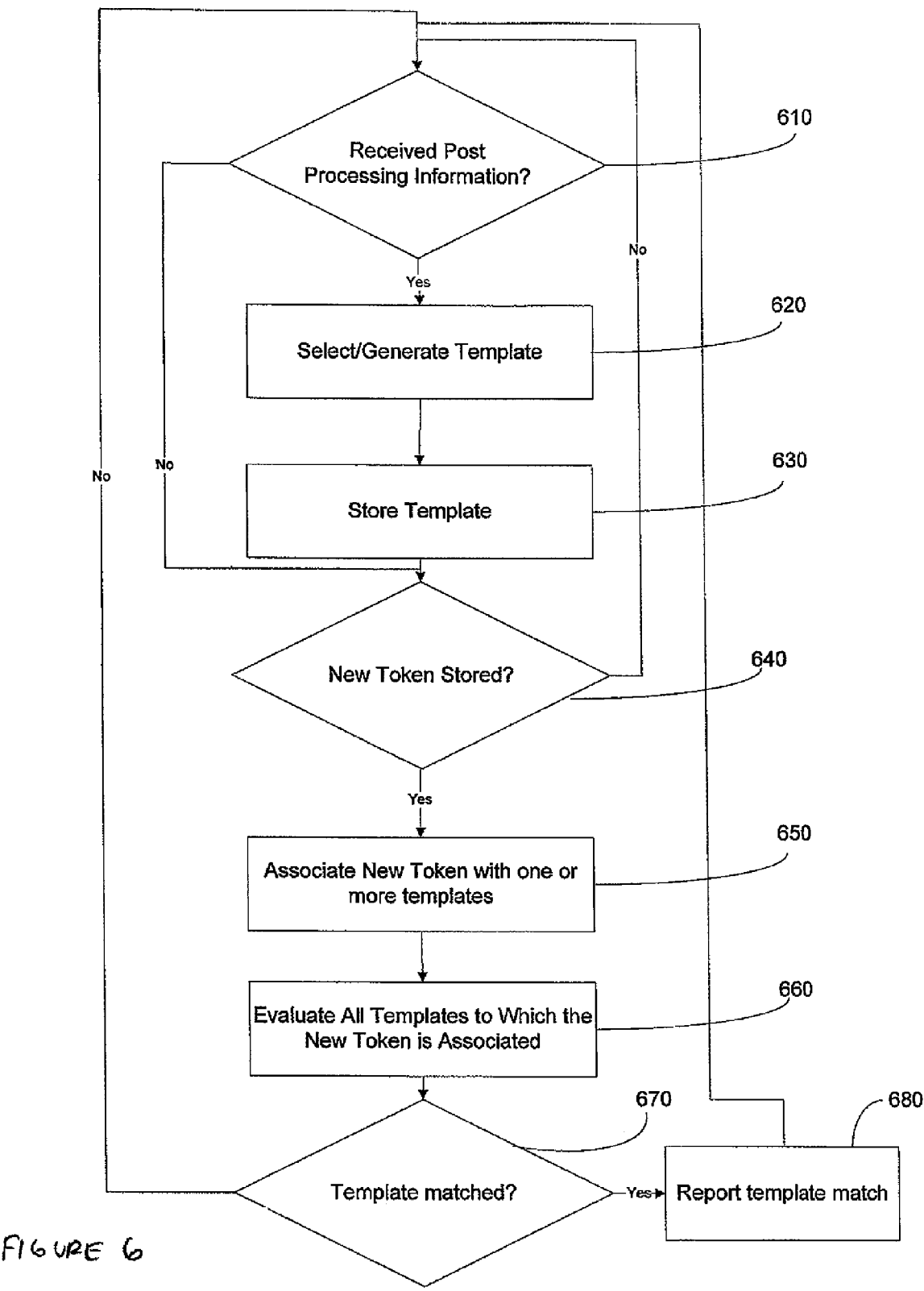
FIG. 6 is a flowchart illustrating an exemplary processing method performed by the post processing module of FIG. 5.

FIG. 6 is a flowchart illustrating an exemplary processing method performed by the post processing module 330 of FIG. 5. As noted above, the post processing module 330 is configured to select static templates associated with each of one or more range asserting expressions in one or more regular expressions. The templates are then activated and evaluated as the DFA engine locates the indicated subexpressions.

Beginning at a block 610, the execution logic 520 determines if post processing information related to a range asserting expression has been received from the compiler 310. As noted above, the post processing information may contain an indication of a template that should be applied to the subexpressions of a range asserting expression. In another embodiment, the post processing information may include match criteria that may be used by the post processing module 330 to generate a template, rather than selecting a template from the template store 510. If post processing information has been received, the execution logic 520 continues to a block 620; otherwise, the execution logic proceeds to a block 640, which is discussed in further detail below.

Moving to a block 620, a template indicated in the post processing information is selected and/or generated. In one embodiment, the post processing information indicates a specific template that should be selected from the template store 510. In other embodiments, however, the post processing information contains match criteria that may be used by the execution logic 520 to generate an appropriate active template. In either case, the active template indicates a relationship between subexpressions of the range asserting expression.

Continuing to a block 630, the active template is stored in memory, such as in the buffer 530. As noted above, in certain embodiments, a range of memory locations of buffer 530 may be reserved for recordation of token information related to the subexpressions of the range asserting expression.

In a block 640, the execution logic 520 determines if a new token has been generated by the DFA engine 320 and made available to the post processing module 330. If no new tokens have been generated by the DFA engine 320, re-evaluation of the active templates may not be necessary. Thus, if at block 640 no new tokens have been generated, the execution logic 520 returns to block 610. If, however, a token has been made available to the post processing module 330, the execution logic 520 moves to block 650 and begins to evaluate the assertions of the one or more active templates to which the newly located token is associated.

Moving to a block 660, the execution logic 520 associates the newly generated token with one or more templates stored in the buffer 530. For example, if subexpressions $\alpha$ and $\beta$ are associated with a first active template (e.g., related to range-asserting expression $\alpha.\{1,23\}\beta$) and subexpressions $\beta$ and $\gamma$ are associated with a second active template (e.g., related to range asserting expression $\beta.\{3,8\}\gamma$), a token representing an occurrence of subexpression $\alpha$ within the data stream would be associated with the first active template and not the second active template. However, a token representing an occurrence of subexpression $\beta$ would be associated with both the first and second active templates. In one embodiment, token information is recorded in the buffer for each active template to which the token is related.

Next, in a block 660, the active templates to which the new token was associated are evaluated to determine if any of the active templates have been satisfied by the data stream. In one embodiment, an active template for a byte counting construct comprising two subexpressions indicates a range between the two subexpressions. In this embodiment, evaluation of the active template comprises determining if there is at least one token for each of the two subexpressions and, if so, determining if the subexpression location information in the tokens indicate that the subexpressions are within the range indicated in the active template.

Moving to a block 670, if all assertions of an active template have been satisfied by located subexpressions, as indicated in the generated tokens, the execution logic 520 continues to a block 680 where location of the range asserting expression is reported. If, however, an active template has not been matched, the execution logic 520 returns to block 610 and repeats the process. In one embodiment, at block 680, the execution logic 520 transmits information including the actual subexpressions located, a start and end location of each subexpression relative to the start of the data stream, a length of each subexpression, and/or the entire pattern that matches the range asserting expression, including the characters between the subexpressions.

In one embodiment, the post processing module 330 also comprises a retirement module that is configured to determine when an active template that has been stored in the buffer 530 may be removed from the buffer 530. Prompt removal of active templates from the buffer 530 as soon as they are no longer necessary may improve system performance by maintaining as much free memory in the buffer 530 as possible. In one embodiment, the retirement module initiates removal of an active template when the active template can no longer be satisfied by the data stream. For example, if a byte counting expression has a minimum range of 200 and a first subexpression of the byte counting expression has not yet been located in the data stream with only 100 characters remaining in the data stream, the active template cannot be matched in the data stream and may be removed from the buffer. Similarly, if a byte counting an expression has a maximum range of 200, a first subexpression of the byte counting expression has been located, and the DFA engine 320 is now processing characters in the data stream that are more than 200 characters away from the first subexpression, the active template can no longer be matched in the data stream and may be removed from the buffer 530. In another embodiment, the retirement information may indicate that an active template may be retired upon location of an indicated series of characters.

In one embodiment, the post-processing information generated by the compiler 310 includes information regarding retirement of an indicated template. In another embodiment, the static template includes information regarding retirement of the template. The retirement information included in the post processing information or a static template may include, for example, a distance indicator specifying a relative position in a data stream at which a particular template may be retired.

In another embodiment, the bifurcated regular expression matching systems and methods described above may be used in the application of regular expressions including "back references." In general, a subexpression may include a back reference that refers to the actual characters of a string that has previously been located in a data stream. Thus, in order to evaluate a regular expression comprising a back reference, the string referred to in the back reference must first be located and, subsequently, the back reference, or the actual text of the located string, must then be matched in the data stream. Accordingly, a regular expression may include a reference to the actual characters (even though those actual characters are unknown prior to application of the regular expression) that were previously matched by a subexpression. For example, the expression '([a–z]+)[\t]+\1' includes a back reference that is expressed as "\1", where the "\" is an escape character indicating that the following character(s) are not literal characters, and where the 1 identifies a specific back reference string. Those of skill in the art will recognize that this syntax may be altered depending on the programming language and the specific applications for which the regular expression is implemented. This exemplary regular expression matches one or more lower case letters ([a–z]+) followed by one or more white spaces ([\t]), followed by the actual characters matched by the subexpression in parentheses ('\1'). In this embodiment, the string matching the subexpression within the parentheses is stored and may be referred to subsequently in the regular expression using predefined syntax, such as a backslash followed by a numerical identifier of the back reference. Thus, the expression '([a–z]+)[\t]+1' would find all repeated words in a document, e.g., it would match 'the the' and 'at at', but would not match 'the cat'.

In certain embodiments, a range may be specified between the location of a located string and the subsequent back reference to the located string. For example, the expression '(a.*a){20,200}\1' matches the actual subexpression that matches "a.*a", such as "alpha", when that actual subexpression is located again somewhere in the 20th to 200th characters following the string that matches the located subexpression, e.g., between 20 and 200 characters of the location of "alpha" in the data stream. Accordingly, using existing techniques for designing a DFA based system, such an expression would require states that match the location of the back reference at any position between 20 and 200 characters from the location of the string that matches the initial subexpression, e.g., '(a.*a)'.

According to the systems and methods described herein, regular expressions including back references may be evaluated using smaller DFAs and reduced computing power, when compared to the prior art systems. For example, if a regular expression comprises a first subexpression defining a string that may be later referenced by a back reference, and a second subexpression including a back reference to the located string, the compiler 310 may generate a DFA that locates the first subexpression and that locates candidates for the second subexpression. The DFA may be executed by the DFA engine 320 such that when either of the subexpressions is matched in the data stream, a token containing information regarding the located subexpression is transmitted to the post processing module 330. For example, if the first subexpression is located, a token indicating the actual string matched by the first subexpression may be transmitted to the post processing module 330. Likewise, when the second subexpression is located, tokens associated with the located match are transmitted to the post processing module 330. However, because the second subexpression is at least partly defined by the actual text of the first subexpression, any possible matches for the second subexpression cannot be confirmed until after the first subexpression is matched and the string that is referenced in the back reference is identified. Thus, in one embodiment, tokens corresponding to candidate matches of a subexpression including a back reference are transmitted to the post processing module 330. The post processing module 330 may then apply match criteria, such as a template that may be received from the compiler 310 prior to execution of the DFA by the DFA engine 320, in order to determine if any combination of a token corresponding to the first subexpression, where the token indicates the string that is defined as a back reference, and a token associated with candidate matches of the second subexpression satisfy the match criteria.

Storage and reference to the lexemes that are referred to using back references may be performed in several manners, as alternatives to inclusion of the actual lexeme in the tokens that are passed to the post processing module. For example, in one embodiment the characters comprising a matched lexeme are stored in a specially designated back reference store and an index in the store is passed with the token. The post processing module 330 may then access lexemes stored in the back reference store according to the index information that is received in tokens. In another embodiment, tokens corresponding with located lexemes may include pointers to the start and end of the lexemes in the original data stream that is being scanned. In another embodiment, a hash of the literal characters comprising the lexeme may be passed with the token.

Following is a brief description of the operation of the system of FIG. 3 in applying a regular expression including a back reference. For this example, consider the regular expression '<([A-Z][A-Z0-9]*)>.*</\1>', which locates corresponding HTML tags and the text between the tags. For example, this regular expression would return the lexeme "<STRONG>Title </STRONG>". In this example, the expression within the parenthesis defines a string that may be referred to using a back reference, and the actual string that is located by the subexpression ([A-Z][A-Z0-9]*) is referenced using '\1'. In order to prepare the regular expression for application to a data stream, the regular expression is first received at the compiler 310. The compiler 310 generates a DFA comprising states that report, using tokens, for example, the location of a located back reference and candidates for matching the back reference in the data stream. For example, an exemplary DFA may have a first terminal state that indicates the subexpression '([A-Z][A-Z0-9]*)' has been matched. Upon reaching this first terminal state, a token indicating parameters of the located string are transmitted to the post processing module 330. As noted above, the parameters of the located string may include the actual lexeme characters, a pointer to the lexeme in a data store, or pointers to the location of the lexeme in the data stream, for example. The DFA may also have one or more terminal states associated with location of one or more candidate strings, where the candidate strings are possible matches of a subexpression including the actual string located by a back reference.

In one embodiment, the candidate strings that are located by the DFA satisfy the same criteria that define the back reference, e.g., '([A-Z][A-Z0-9]*)'. However, in order to satisfy the regular expression, the candidate string must match the literal string that was located. For example, if the back reference that is located by '([A-Z][A-Z0-9]*)' is 'H1', the string 'H2' will not satisfy a back reference to the located string 'H1'. Thus, many located candidate strings may not match the literal string located by the subexpression that defines the back reference string. In one embodiment, multiple tokens, each corresponding to a located candidate string, are transmitted to the post processing module 330. In an exemplary embodiment, the compiler 310 also generates match criteria, such as a template, that defines a relationship that must exist between the actual string located by a first subexpression and a candidate strings including a back reference to the first subexpression, in order for the regular expression to return a match. Additionally, the match criteria may indicate a character range in which the located string and candidate string must be located in order to satisfy the regular expression. Advantageously, because the DFA locates the back reference and the candidate strings separately, the DFA generated by compiler 310 may be significantly smaller than a DFA that finds the combination of the back reference and the candidate strings.

In one embodiment, the template that is generated by the compiler 310 indicates relationships between tokens associated with each portion of the regular expression. Accordingly, for the regular expression '<([A-Z][A-Z0-9]*)>.*</\1>', the template may define a relationship between six tokens, specifically, three tokens matching the literal strings '<', '>', '</', and '>' as well as 1 token associated with the lexeme that matches ([A-Z][A-Z0-9]*) and 1 token that matches the back reference '\1'. Thus, in order for the post processing module 330 to determine if each of the match criteria, such as match criteria that may be defined in a template, are met, tokens associated with each portion of the regular expression, including those portions that are related to back expressions and those that are not, are transmitted to the post processing module 330. In other embodiments, portions of the regular expression may be divided differently, such that fewer or more tokens are associated with a regular expression. For example, the compiler 310 may indicate that the literal text '</', the back reference '\1, and the literal text '>' are identified by a single token. Thus, various implementations of the compiler 310 may create different quantities of tokens as the regular expression is partitioned differently. Advantageously, according to the systems and methods described herein, partitioning of the regular expression is performed so that the size of the DFA that is generated to match the portions of the regular expression may be optimized. This optimized DFA may then be implemented in various software and/or hardware systems with reduced hardware and computing requirements when compared to implementation of non-partitioned DFAs.

In one embodiment, a regular expression may include multiple subexpression that may be referred to using back references. In addition, a back reference to a particular string may occur multiple times in a regular expression.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof

What is claimed is:

1. A computing device for compiling a regular expression, the regular expression indicating a first subexpression, a second subexpression, and a required relationship between the first subexpression and the second subexpression, the device comprising:
   at least one processor: and
   software code configured for execution by the at least one processor in order to cause the computing device to:
      generate a DFA corresponding to the regular expression, wherein the DFA comprises a first terminal state indicative of locating the first subexpression and a second terminal state indicative of locating the second subexpression; and
      define a match criteria indicating a required relationship between the first subexpression and the second subexpression such that first information regarding the first subexpression located in an input data stream, second information regarding the second subexpression located in the input data stream, and the required relationship indicated in the match criteria are usable to determine whether the regular expression is matched in the input data stream, wherein the DFA does not indicate the required relationship between the first subexpression and the second subexpression.

2. The device of claim 1, wherein the second subexpression comprises the actual text of the first subexpression.

3. The device of claim 2, wherein the software code is further configured to cause the computing device to initiates recordation of one or more tokens corresponding to candidate second subexpressions.

4. The device of claim 3, wherein the software code is further configured to cause the computing device to compares information in a token associated with the first subexpression to information in each of the tokens associated with the candidate second subexpressions according to the match criteria, in order to determine if one or more of the candidate second subexpressions matches the actual text of the first subexpression.

5. The device of claim 3, wherein a post-processing module evaluates the match criteria on the tokens in order to determine if the range asserting expression is matched in the data stream.

6. The device of claim 1, wherein the required relationship comprises a relationship between locations in the data stream of a first character of the first subexpression and a first character of the second subexpression.

7. The device of claim 1, wherein the required relationship comprises a relationship between locations in the data stream of a last character of the first subexpression and a last character of the second subexpression.

8. The device of claim 1, wherein the required relationship comprises a relationship between locations in the data stream of a first character of the first subexpression and a last character of the second subexpression.

9. The device of claim 1, wherein the required relationship comprises a relationship between locations in the data stream of a first character of the first subexpression and a last character of the second subexpression.

10. The device of claim 1, wherein the required relationship comprises a range asserting expression including a range.

11. The device of claim 10, wherein the range is infinite.

12. The device of claim 10, wherein the range is more than 500 characters.

13. The device of claim 10, wherein the range is more than 5,000 characters.

14. The device of claim 10, wherein the range is more than 5,000,000 characters.

15. The device of claim 10, wherein the range comprises a current character in the input data stream and all characters following the current character in the input data stream.

16. The device of claim 10, wherein the match criteria indicates that if a distance between the first and second subexpressions is within the range then the range asserting expression is matched in the input data stream.

17. The device of claim 10, wherein the match criteria indicates that if the second subexpression is located in the input data stream then the range asserting expression is not matched.

18. The device of claim 10, wherein the match criteria indicates that if the second subexpression is located in the input data stream within the range of the first subexpression then the range asserting expression is not matched.

19. The device of claim 1 wherein the first subexpression is located in the input data stream prior to location of the second subexpression in the input data stream.

20. The device of claim 1, wherein the second subexpression is located in the input data stream prior to location of the first subexpression in the input data stream.

21. The device of claim 1, wherein the first information and the second information each include a byte position of a first character of the located subexpression.

22. The device of claim 1, wherein the first information and the second information each include a character length of the located subexpression.

23. The device of claim 1, wherein the match criteria defines a minimum and maximum distance between the respective first characters of the first and second subexpression.

24. The device of claim 1, wherein generating a DFA corresponding to the regular expression comprises generating a NFA corresponding to the regular expression and then generating a DFA corresponding to the NFA.

25. The device of claim 1, wherein the device is in data communication with a DFA engine configured to apply the DFA to the received data stream.

26. The device of claim 1, wherein upon reaching the first or second terminal state, a DFA engine initiates recordation of tokens regarding the respective first and second subexpressions.

27. A computerized method of generating state machine data comprising a deterministic finite automata (DFA) and a match criteria, the computerized method comprising:

receiving a regular expression indicating a required relationship between a first subexpression of the regular expression and a second subexpression of the regular expression;

generating a DFA corresponding to the regular expression, wherein the DFA comprises a first terminal state indicative of locating the first subexpression of the regular expression and a second terminal state indicative of locating the second subexpression of the regular expression, wherein the required relationship is not indicated in the DFA;

generating a match criteria indicating the required relationship between the first subexpression and the second subexpression in an input data stream, wherein the match criteria is usable to determine whether the regular expression is matched in the input data stream in response to locating the first subexpression and the second subexpression in the input data stream.

* * * * *